US011907102B2

(12) United States Patent
Kumar A et al.

(10) Patent No.: US 11,907,102 B2
(45) Date of Patent: Feb. 20, 2024

(54) DYNAMIC DEBUG LOG ENABLER FOR ANY PROTECTION FAILURE JOBS

(71) Applicant: Dell Products L.P., Round Rock, TX (US)

(72) Inventors: Pravin Kumar A, Bangalore (IN); Preeti Varma, Bangalore (IN); Jayashree Radha, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 17/582,603

(22) Filed: Jan. 24, 2022

(65) Prior Publication Data

US 2023/0236953 A1 Jul. 27, 2023

(51) Int. Cl.
*G06F 11/36* (2006.01)

(52) U.S. Cl.
CPC ........ *G06F 11/3656* (2013.01); *G06F 11/366* (2013.01); *G06F 11/3636* (2013.01)

(58) Field of Classification Search
None
See application file for complete search history.

(56) References Cited

U.S. PATENT DOCUMENTS

| | | | | |
|---|---|---|---|---|
| 10,853,178 B1* | 12/2020 | Pan | ............... | G06F 11/3055 |
| 2005/0251625 A1* | 11/2005 | Nagae | ............ | G06F 11/1471 |
| | | | | 714/E11.13 |
| 2013/0042153 A1* | 2/2013 | McNeeney | ............ | G06F 11/366 |
| | | | | 714/E11.208 |
| 2014/0006881 A1* | 1/2014 | Loimuneva | ......... | G06F 11/0787 |
| | | | | 714/57 |
| 2014/0240322 A1* | 8/2014 | Brumer | ............ | G06T 5/002 |
| | | | | 345/442 |
| 2014/0359375 A1* | 12/2014 | Longobardi | ........ | G06F 11/3476 |
| | | | | 714/45 |
| 2015/0074055 A1* | 3/2015 | Jacoby | ............ | G06F 11/0778 |
| | | | | 707/639 |
| 2015/0143182 A1* | 5/2015 | Rajamanickam | ... | G06F 11/0781 |
| | | | | 714/48 |
| 2019/0108004 A1* | 4/2019 | Kavanagh | ............ | G06F 11/3409 |
| 2022/0308982 A1* | 9/2022 | Ruan | ............ | G06F 11/302 |

OTHER PUBLICATIONS

H. Patil, A. Isaev, W. Heirman, A. Sabu, A. Hajiabadi and T. E. Carlson, "ELFies: Executable Region Checkpoints for Performance Analysis and Simulation," 2021 IEEE/ACM International Symposium on Code Generation and Optimization (CGO), Seoul, Korea (South), 2021, pp. 126-136. (Year: 2021).*

* cited by examiner

*Primary Examiner* — Andrew M. Lyons
(74) *Attorney, Agent, or Firm* — Chamberlain, Hrdlicka, White, Williams & Aughtry; Aly Z. Dossa

(57) ABSTRACT

The present invention provides a system, computer readable code and method for dynamically performing debugging. The system, code, and method store debugging logs throughout an operation. At predetermined points the logs are stored to a cache. Older and/or unnecessary logs are periodically deleted from the cache to ensure that the cache does not grow to be larger than a predetermined size. This avoids the need to re-run a scenario after an error occurs in order to produce troubleshooting/debugging information.

6 Claims, 4 Drawing Sheets

DYNAMIC DEBUG LOG ENABLER FOR ANY PROTECTION FAILURE JOBS

BACKGROUND

Computing devices in a system may include any number of internal components such as processors, memory, and persistent storage. These systems execute various operations such as backups that are increasingly complicated and can end in failure. As operations experience failures, debug logs can be used to provide required information for troubleshooting/debugging.

However, debug logging is typically disabled, because debug logs can take up considerable space. If an error occurs during an operation, a user will need to enable debug logs and re-run the scenario to gather the required information for further troubleshooting/debugging. However, many issues are not reproducible making troubleshooting/debugging difficult.

SUMMARY

Embodiments of the present invention provide a method and computer readable code for dynamically performing debugging. The method and code store debugging logs throughout an operation. At predetermined points the logs are stored to a cache. Older and/or unnecessary logs are periodically removed from the cache to ensure that the cache does not grow to be larger than a predetermined size. This avoids the need to re-run a scenario after an error occurs in order to produce troubleshooting/debugging information, and avoids taking up excessive storage space.

In accordance with the first aspect, the present invention provides a method for dynamically producing a debug log. The method includes detecting initiation of an operation. Once the initiation of the operation is detected then the method produces a debug log for a predetermined portion of the operation and stores that debug log in a dynamic logger cache. If the operation fails during the predetermined portion, the method writes the debug log stored in the dynamic logger cache to a debug log file in the persistent storage. If the operation does not fail during the predetermined portion, the method deletes previously stored debug logs in the dynamic logger cache according to a predefined procedure. This is repeated for each portion of the operation until either the operation finishes or the operation fails.

In accordance with the second aspect, the present invention provides a non-transitory computer readable medium comprising computer readable program code, which when executed by a computer processor enables the computer processor to perform a method. The method includes detecting initiation of an operation. Once the initiation of the operation is detected, then the method produces a debug log for a predetermined portion of the operation and stores that debug log in a dynamic logger cache. If the operation fails during the predetermined portion, the method writes the debug log stored in the dynamic logger cache to a debug log file in persistent storage. If the operation does not fail during the predetermined portion, the method deletes previously stored debug logs in the dynamic logger cache according to a predefined procedure. This is repeated for each portion of the operation until either the operation finishes or the operation fails.

In accordance with the third aspect, the present invention provides an electronic device that comprises of a dynamic logger cache, a persistent storage, a processor and a memory. The memory has computer program instructions stored thereon, the processor executes the computer program instructions in the memory to perform a method. The method includes detecting initiation of an operation. Once the initiation of the operation is detected, then the method produces a debug log for a predetermined portion of the operation and stores that debug log in a dynamic logger cache. If the operation fails during the predetermined portion, the method writes the debug log stored in the dynamic logger cache to a debug log file in persistent storage. If the operation does not fail during the predetermined portion, the method deletes previously stored debug logs in the dynamic logger cache according to a predefined procedure. This is repeated for each portion of the operation until either the operation finishes or the operation fails.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
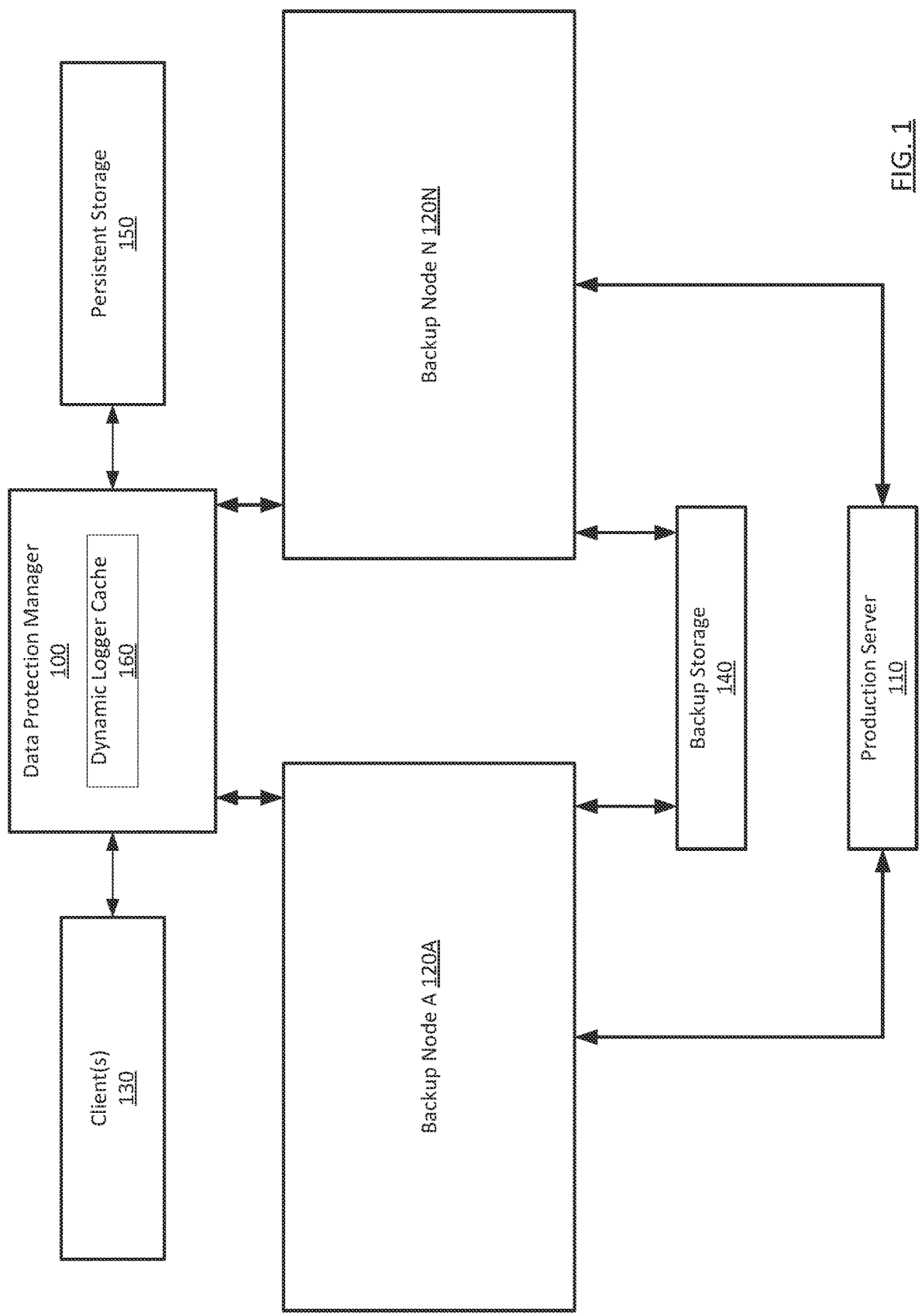
FIG. 1 shows a system in accordance with one or more embodiments of the invention.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regards to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Embodiments of the present invention provide a method and computer readable code for dynamically performing debugging. The method facilitates the storage of debugging logs throughout an operation (e.g., a backup operation). At predetermined points the logs are stored to a cache. Older and/or unnecessary logs are periodically deleted from the cache to ensure that the cache does not grow to be larger than a predetermined size. This avoids the need to re-run a scenario after an error occurs during performance of the operation in order to produce troubleshooting/debugging information related to the error.

One or more embodiments disclosed herein are directed to systems and methods for dynamically performing debugging. In particular, during an operation such as a backup, debug logs are continuously produced and stored in a dynamic logger cache. If an error or fault occurs during the operation, the debug logs in the cache are recorded to persistent storage for analysis.

Over time, older ones of the debug logs become unnecessary and take up storage space in the dynamic logger cache. In order to prevent the cache and/or the debug logs from becoming too large, as new debug logs enter the cache, old debug logs are deleted. This keeps the dynamic logger cache and/or debug logs from becoming too large and/or unmanageable, while minimizing the need to re-run a failed operation to gather information for determining where and why a fault occurs in either the system or the operation.

Various embodiments discussed above are now described in more detail below.

FIG. 1 shows a system in accordance with one or more embodiments of the invention. The system includes a data protection manager (100), one or more backup nodes (120A, 120N), one or more clients (130), persistent storage (150), a backup storage (140) and production server (110). The system may include additional, fewer, and/or different components without departing from the invention. Each component may be operably connected to any of the other components via any combination of wired and/or wireless connections. Each component illustrated in FIG. 1 is discussed below.

A data protection manager (100) is provided which monitors an operation that is initiated by a client (130) or that is automatically initiated based on procedures configured in the system. In one or more embodiments of the inventions, these operations can be backup operations. In other embodiments of the invention, the operations other than a backup operation, can be monitored by the data protection manager (100) and the methods described in FIG. 3 can be used to assist in debugging errors or faults that occur in such operations.

In at least one embodiment of the invention, the data protection manager (100) includes functionality to manage backup operations. Specifically, the data protection manager (100) includes functionality to orchestrate backup operations. The orchestration includes creating one or more jobs, and then distributing the jobs to the backup nodes to execute the one or more jobs. While the data protection manager (100) orchestrates the backup operations, e.g., orchestrates the servicing of the backup requests, the work required to backup data that is the subject of the backup request, is primarily done by one or more backup nodes (120).

Further, in one or more embodiments of the invention, the jobs may be serviced using a set of microservices. For example, if the job is a backup job then the following four microservices are used to service the job—application discovery manager (ADM), an agent service, a workflow service, and a user interface (UI) service. These microservices may be implemented on one or more backup nodes (e.g., in one or more containers) and work collectively to service the job.

Figure 3:
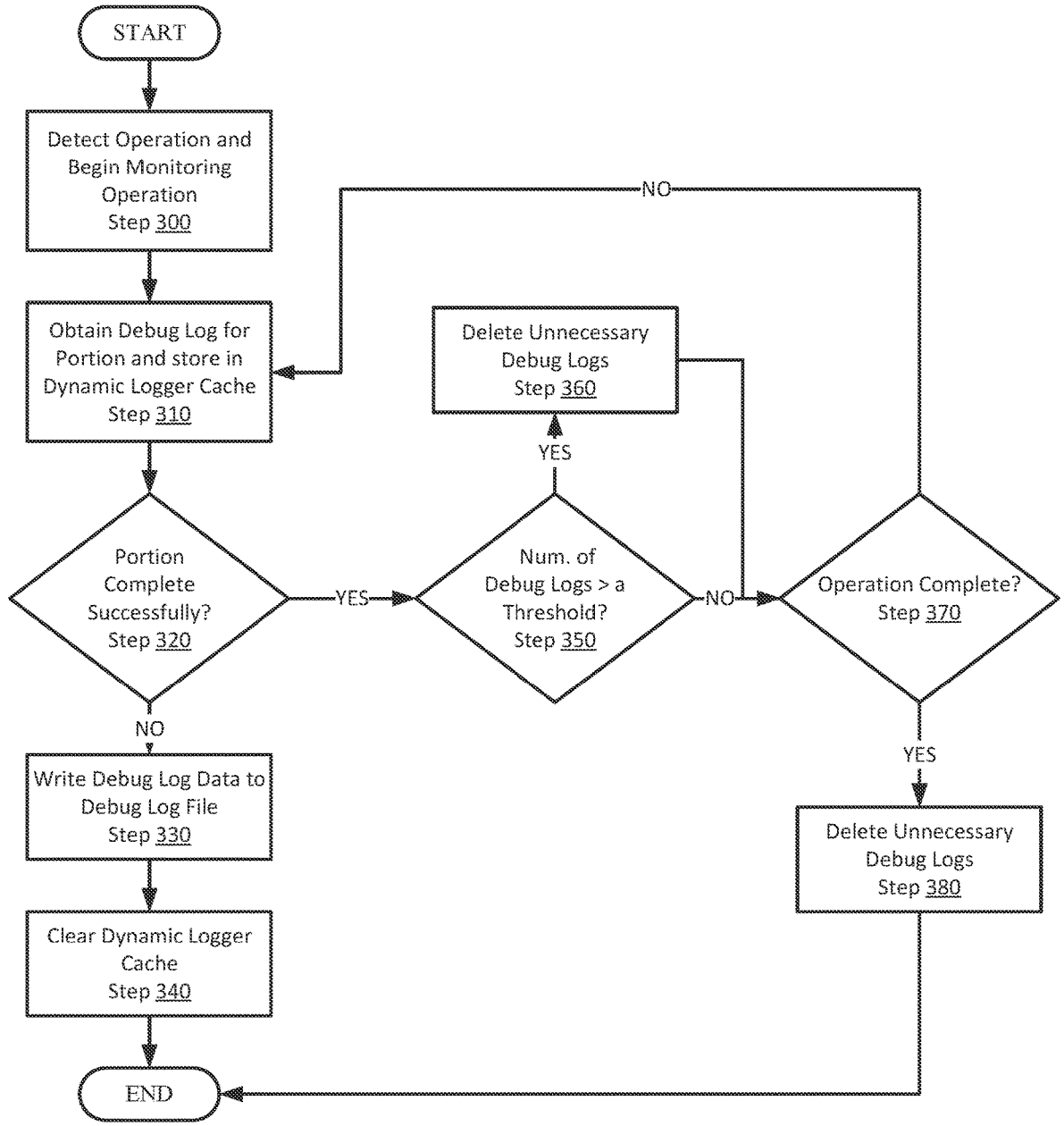
FIG. 3 shows a method for dynamically producing a debug log in accordance with one or more embodiments of the invention.

The data protection manager (100) provides the functionality described throughout this application and/or all, or a portion thereof, of the method illustrated in FIG. 3.

Figure 4:
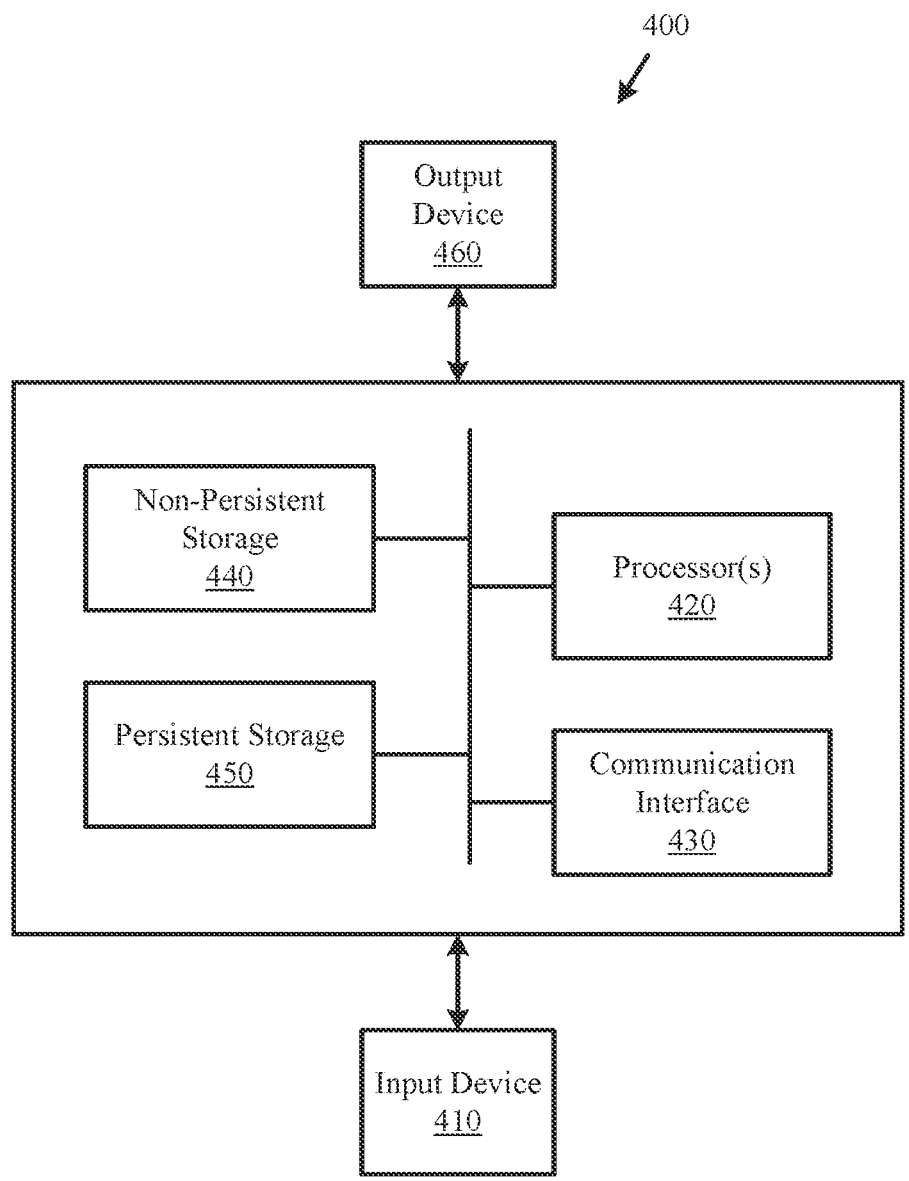
FIG. 4 shows a computing device in accordance with one or more embodiments of the invention.

In one or more embodiments of the invention, the data protection manager (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the data protection manager (100) described throughout this application.

In one or more embodiments of the invention, the data protection manager (100) is implemented as a logical device. The logical device may utilize the computing resources of any number of computing devices, and thereby provide the functionality of the data protection manager (100) described throughout this application.

In one embodiment of the invention, the backup node (120A, 120N) includes functionality to interact with the data protection manager (100) to receive jobs, and to provide telemetry information (which may, but is not required to be) in real-time or near real-time. The backup node (120A, 120N) may include functionality to execute one or more jobs created by the data protection manager (100) or client(s) (130).

In one or more embodiments of the invention, the backup nodes (120A, 120N) are implemented as computing devices (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the backup nodes (120A, 120N) described throughout this application.

In one or more embodiments of the invention, backup nodes (120A, 120N) are implemented as logical devices. The logical device may utilize the computing resources of any number of computing devices, and thereby provide the functionality of the backup nodes (120A, 120N) described throughout this application.

In one embodiment of the invention, the backup storage (140) includes any combination of volatile and non-volatile storage (e.g., persistent storage) that stores backup copies of the data that was (and may still be) in the production server. The backup storage may store data in any known or later discovered format.

In one embodiment of the invention, the production server (110) may include any combination of volatile and non-volatile storage (e.g., persistent storage) that stores data that is being actively used by one or more production systems (not shown) such as an application server or any other appropriate servers. In one non-limiting example, the production server (110) may include a network attached storage (NAS) server and may implement any known or later discovered protocols that are used to read from and write data to the NAS. Other combinations of servers and/or storage can be conceived of and may form and/or be associated with the production server (110).

In one embodiment of the invention, the jobs that are serviced by the backup nodes result in data being read from the production server (110) and then stored on the backup storage (140) to create incremental and/or full backups. The aforementioned reading and/or writing may be performed by one or more microservices.

Continuing with the discussion of FIG. 1, in one embodiment of the invention, the client(s) (130) are used by administrators to interact with the data protection manager (100). The administrators, via the clients (130), may send requests to initiate backup operations, perform dynamic debugging logging (e.g., FIG. 3) and/or other operations.

In one or more embodiments of the invention, the client(s) (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the client(s) (130) described throughout this application.

In one or more embodiments of the invention, the client(s) (130) is implemented as a logical device. The logical device may utilize the computing resources of any number of computing devices, and thereby provide the functionality of the backup nodes (120A, 120N) described throughout this application.

In one or more embodiments of the invention, the data protection manager (100) includes a dynamic logger cache (160) for storing telemetry data such as from the backup nodes, in the form of a debug log. The dynamic logger cache (160) is shown in more detail in FIG. 2. The dynamic logger cache (160) can have a preset size, which is determined based on the specific operation, application, and/or as a result of the physical size of available storage. Alternatively, the dynamic logger cache (160) can have a variable size that is adjusted based on the needs of a particular operation to provide an adequate amount of space for anticipated debug logs. The dynamic logger cache (160) can generally store a limited number of portion logs (210A-210N, FIG. 2), which can be determined based on its preset size or other criteria for data retention.

Figure 2:
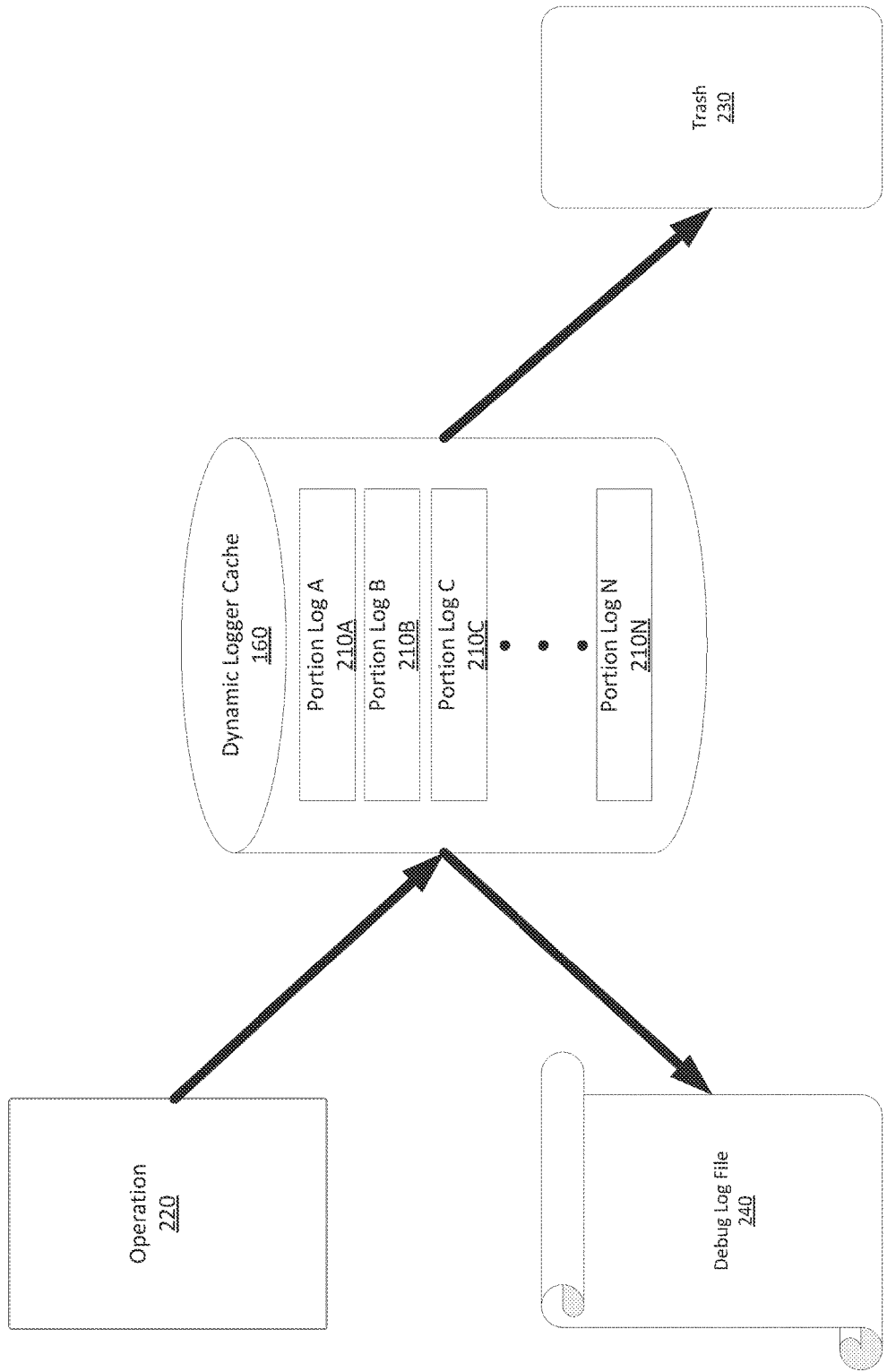
FIG. 2 shows a diagram of a debugging system in accordance with one or more embodiments of the invention.

As shown in FIG. 2 data from an operation, such as from a backup operation, is stored in portions (210A-210N), which in one or more embodiment of the invention can be associated with individual processes in an operation (220). The specific manner of separating the processes of the operation into portions is predetermined based on the specific needs of the operations and/or predetermined criteria such as the size of the dynamic logger cache (160) or other specifics of the specific operation (220) and the overall system. In at least one embodiment the portions (210A-210N) are associated with predetermined periods of times (such as every hour, every ten minutes, every minute, every second, or any particular division of time that is useful for the specific operation). In yet another embodiment each portion is a predetermined set of processes performed prior to a checkpoint located in code associated with the operation (220). Other manners of separating the processes of the operation into the portions can be used as needed or determined for a particular operation, configuration, and/or system.

As the dynamic logger cache (160) fills with portion logs (210A-210N), older or not as useful portion logs (210A-210N) are deleted (placed in system trash (230)) according to a predefined procedure (for example if the first portion log (210A) was found not to be useful it would be removed from the dynamic cache (160) and placed in a system trash (230) and deleted according to the systems retention policies). In other embodiments older, but potentially still useful logs can be moved to persistent storage (150) and can be retained until the operation successfully completes, the size of the files in persistent storage or the dynamic logger cache exceed a predetermined size, or the logs are no-longer useful for debugging. The predefined procedure can take many forms depending on the specific operation/application.

In at least one embodiment, the predefined procedure comprises of deleting the oldest of a plurality of logs when the number of debug logs is greater than a threshold determined by the size of the dynamic logger cache (160) or other predetermined criteria. In other embodiments, the predefined procedure comprises of deleting debug logs which are determined to not be useful for any future faults or errors (as a non-limiting example, a procedure for connecting to an external processor, would no longer be useful once the connection is established and verified to be functioning properly). In yet another embodiment the predefined procedure would be to delete all but the last predetermined number of debug logs when a particular checkpoint is reached. Any of the previous embodiments of the predefined procedure can be performed alone or in combination with any other predefined procedure as required for a specific operation, system, and/or application. Further other predefined procedures can be used as appropriate.

In one or more embodiments of the invention, additional persistent storage (150) may be provided. When an error occurs, the persistent storage (150) provides space for storing a debug log file (240), which can be compressed in accordance with one more embodiments of the invention using known data compression methods. The persistent storage (150) that holds the debug log file (240) in one or more embodiments of the invention, may be portable storage such as a flash drive, optical disc, and/or portable hard drive.

Alternatively, in other embodiments of the invention, the persistent storage (150) (e.g., disk drives, solid state drives, etc.) can be persistent storage associated with the data protection manager (100), the clients (130) and/or any other components of the system of FIGS. 1 and 2.

FIG. 3 shows a method for enabling dynamic debug logging in accordance with one or more embodiments of the invention. The method shown in FIG. 2 may be performed by, for example, the data protection manager (100). Other components of the system in FIGS. 1 and 2 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, when the client (130) or other portion of the system of FIGS. 1 and 2 initiates an operation (for example, a job related to a backup operation), the system and method detects the operation and begins monitoring the operation. This can be done by the data protection manager (100) or a different component such as a debug logging engine (not shown) that can be present in any of the components of the system. The system produces and/or obtains telemetry data and/or other pertinent information regarding each process and/or portion of the operation (220).

At least for the purposes of producing the debug logs, the operation is divided into a series of portions. These portions can be the result of any operation trigger (configuration, delete, backup, restore, replication . . . etc.) as the control flow. The portions may be parts of the operation that are associated with checkpoints that are predetermined in the operation, such as specific tags in the code that a processor executes in order to perform the operation. In other embodiments, the portions may be of preset size related to the size of a dynamic logger cache or other storage means, or could be related to the size of a debug log portion that a user, developer, and/or appropriate application needs to understand a particular fault/error with the execution of the operation. In yet another embodiment each portion can be the telemetry and other data associated with a preset amount of time, such as, in a non-limiting example, every five minutes. Other methods of dividing an operation and/or its debug logs into portions can be used including methods that result in portions of dynamic size, depending on the specific process and/or operation being performed.

This telemetry data and/or information forms the content of a debug log, which in step 310 is obtained and stored in the dynamic logger cache (160) against a unique trace context. In at least one embodiment, the unique trace can comprise of the request trace id and process id. The unique trace context can take other forms as appropriate for a specific system and/or operation. This trace context in at least one embodiment can serve as the key to the cache and/or file name if the debug logs are written to a debug log file (240).

The dynamic logger cache (160) in at least one embodiment can be volatile memory in the data protection manger (100), other temporary storage, and/or can be a portion of storage (either volatile or non-volatile) on any of the clients (130) backup nodes (120) backup storage (140) and/or production server (110). In at least some embodiments the dynamic logger cache (160) is of a limited size and could be used for storage of other data besides the debug logger data discussed herein.

In step 320 the method determines if the portion of the operation has been completed successfully. When the operation does not complete successfully, an error message or other indication can be returned to the data protection manger (100), clients (130), and/or other monitoring systems. Based on this error message or other indication, the method determines that the portion and/or operation has not completed successfully and the method then proceeds to step 330. Other processes for determining a portion that has not completed successfully can be used and the method is not limited to receiving an error message.

In step 330 the method writes the contents of the debug log data stored in the dynamic logger cache to a debug log file (240), which optionally can be stored in persistent storage (150). In other embodiments, the debug log file (240) can be transmitted over a network to an appropriate user or system, which can perform review of the system and/or make appropriate corrections to the operation/system based on the contents of the debug log data previously stored in the dynamic logger cache (160).

In step 340, the dynamic logger cache is cleared once the debug log data has been written to a debug log file (240). This allows the cache to be used for further operations such as rerunning the operation to reproduce the error or determine if the error has been corrected. Alternatively, this step can be skipped such as if it is necessary to maintain the debug log data locally.

Step 350 is then performed if the portion is determined to have completed successfully in step 320. In step 350, the dynamic logger cache (160) is analyzed and it is determined if the number of debug logs within it is greater than a threshold. If it is greater than a threshold, the unnecessary debug logs are deleted in step 360 according to a predetermined process, discussed in more detail above with regards to FIG. 2.

The threshold can take many forms and is predetermined based on the size of the dynamic logger cache (160) as well as any other uses of the dynamic logger cache (160) and/or the specific needs of the particular operation (220) being performed. Additionally or alternatively, the threshold can be based on the size of the debug logs and/or the number of debug logs. In other embodiments, the threshold may be an amount of time covered by the debug logs, such as in a non-limiting example an hour worth of logs or other portion of time appropriate to a specific operation and system configuration.

If the unnecessary debug logs have been deleted or if the number of debug logs is less than the threshold, the method continues to step 370. In step 370 it is determined if the operation has completed (e.g., whether all portions of the operation have successfully completed). If it has, the unnecessary debug logs are deleted in step (380). If the operation still has more portions to complete, the method repeats steps 310-370 until the operation is complete or if one of the portions is not successfully completed (e.g., the portion fails).

The method of FIG. 3 may end following either steps 340 or 380. The aforementioned process may be performed each time an operation is identified. Further, once the operation is complete, the data protection manager may send commands to return the dynamic debug logging back to being disabled (if dynamic debug logging is only performed for select operations).

To further clarify embodiments of the invention, a non-limiting example is provided using the method of FIG. 3 and the systems of FIGS. 1 and 2 to collect debug logs for a backup.

Beginning of Example

In the example the backup operation has five portions: portion 1—Backup request received, portion 2—Protection Policy identified, portion 3—backup request submitted to agent, portion 4—task monitoring stated, and portion 5—backup being performed. For each of the first four portions, the steps of 310, 320, 350, and 370 are carried out. The dynamic logger cache (160) is filled with four debug portion logs detailing 1—the backup request, 2—the policy details 3—the agent response, and 4—the task application programming interface (API) response.

With the fourth portion, at step 350, it is determined based on a predefined procedure that the first two logs (1—the backup request and 2—the policy details) should be deleted as they are no longer useful for debugging any future failures that might occur. The data contained in the two logs is removed from the dynamic logger cache (160) and placed in the system trash (230). The remaining two logs (3—the agent response, and 4—the task API response) are kept in the dynamic logger cache (160). The method returns to step 310.

At the fifth portion, the backup fails. The failure is written to a final portion log in step 310. In step 320 the method determines that the portion did not complete successfully. The method then has the content of the dynamic logger cache (160) written to a debug log file (240), which can be analyzed by a user of other system for performing debugging of the backup. The debug log file (240) will contain logs of three portions: 3—the agent response, 4—the task API response, and 5—backup failure. In step 340 the dynamic logger cache is then cleared and the data protection manager (100) can use the dynamic logger cache (160) for other operations, while the backup operation is debugged and/or corrected.

End of Example

Additionally, as discussed above, embodiments of the invention may be implemented using a computing device. FIG. 4 shows a diagram of a computing device in accordance with one or more embodiments of the invention. The computing device (400) may include one or more computer processors (420), non-persistent storage (440) (e.g., volatile memory, such as random access memory (RAM), cache memory), persistent storage (450) (e.g., a hard disk, an optical drive such as a compact disk (CD) drive or digital versatile disk (DVD) drive, a flash memory, etc.), a communication interface (430) (e.g., Bluetooth interface, infrared interface, network interface, optical interface, etc.), input devices (410), output devices (460), and numerous other elements (not shown) and functionalities. Each of these components is described below.

In one embodiment of the invention, the computer processor(s) (420) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (430) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (460), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (420), non-persistent storage (440), and persistent storage (450). Many different types of computing devices exist, and the aforementioned input and output device(s) may take other forms.

Embodiments of the invention may provide an improved method for dynamically performing debugging. In particular, during an operation such as a backup, debug logs are continuously produced and stored in a cache. If an error or fault occurs during the operation, the debug logs in the cache are recorded to persistent storage for analysis, automatically without a user needing to re-run a failed operation or perform other acts to produce the debug log.

As the operation is performed, debug logs are produced and stored in a dynamic debug logger cache. As the operation continues, over time, older ones of the debug logs become unnecessary and/or needlessly take up storage space in the cache. In order to prevent the cache and/or logs from becoming too large, as new debug logs enter the cache, old and/or unnecessary logs are deleted. This keeps the cache and/or logs at a manageable size, while minimizing the need to re-run a failed operation to gather information for determining where and why a fault occurs in either the system or the operation.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data protection manager. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for dynamically producing a debug log, comprising:
    detect initiation of an operation, wherein the operation is a backup operation;
    produce a debug log for a predetermined portion of the operation,
        wherein operation is divided into a plurality of portions,
        wherein the each of the plurality of portions is identified using one of a plurality of checkpoints in code for the operation, and
        wherein the predetermined portion is one of the plurality of portions;
    store the debug log for the predetermined portion in a dynamic logger cache, wherein:

if the operation fails during the predetermined portion, write the debug log stored in the dynamic logger cache to a debug log file in persistent storage; or if the operation does not fail during the predetermined portion, delete the debug log in the dynamic logger cache according to a predefined procedure, wherein the predetermined portion is identified using a first checkpoint of the plurality of checkpoints, wherein the predefined procedure specifies deleting the debug log when a second checkpoint of the plurality of checkpoints is reached, and wherein the second checkpoint is reached after the first checkpoint; and repeat the producing and storing of the debug log for each portion of the operation until either the operation ends or a portion of the operation fails.

2. The method of claim 1, wherein the debug log is produced by a data protection manager.

3. The method of claim 1, wherein the debug log is enabled by default.

4. A non-transitory computer readable medium comprising computer readable program code, which when executed by a computer processor enables the computer processor to perform a method, the method comprising:

detecting initiation of an operation, wherein the operation is a backup operation;

producing a debug log for a predetermined portion of the operation, wherein operation is divided into a plurality of portions, wherein the each of the plurality of portions is identified using one of a plurality of checkpoints in code for the operation, and wherein the predetermined portion is one of the plurality of portions;

storing the debug log for the predetermined portion in a dynamic logger cache, wherein:

if the operation fails during the predetermined portion, write the debug log stored in the dynamic logger cache to a debug log file in persistent storage; or if the operation does not fail during the predetermined portion, delete the debug log in the dynamic logger cache according to a predefined procedure, wherein the predetermined portion is identified using a first checkpoint of the plurality of checkpoints, wherein the predefined procedure specifies deleting the debug log when a second checkpoint of the plurality of checkpoints is reached, and wherein the second checkpoint is reached after the first checkpoint; and repeating the producing and storing of the debug log for each portion of the operation until either the operation ends or a portion of the operation fails.

5. The non-transitory computer readable medium of claim 4, wherein the debug log is produced by a data protection manager.

6. An electronic device comprising:
a dynamic logger cache;
a persistent storage;
a processor; and
a memory having computer program instructions stored thereon, the processor executing the computer program instructions in the memory to perform a method comprising of:

detecting initiation of an operation, wherein the operation is a backup operation, wherein operation is divided into a plurality of portions, wherein the each of the plurality of portions is identified using one of a plurality of checkpoints in code for the operation, wherein the predetermined portion is one of the plurality of portions;

producing a debug log for a predetermined portion of the operation;

storing the debug log for the predetermined portion in the dynamic logger cache, wherein:

if the operation fails during the predetermined portion, writing the debug log stored in the dynamic logger cache to a debug log file in the persistent storage; or if the operation does not fail during the predetermined portion, delete the debug log in the dynamic logger cache according to a predefined procedure, wherein the predetermined portion is identified using a first checkpoint of the plurality of checkpoints, wherein the predefined procedure specifies deleting the debug log when a second checkpoint of the plurality of checkpoints is reached, and wherein the second checkpoint is reached after the first checkpoint; and repeating the producing and storing of the debug log for each portion of the operation until either the operation ends or the operation fails.

* * * * *